(12) United States Patent
Suh et al.

(10) Patent No.: US 10,126,146 B2
(45) Date of Patent: Nov. 13, 2018

(54) PIEZOELECTRIC ACTUATOR AND METHOD OF MEASURING MOTION BY USING THE SAME

(71) Applicants: SAMSUNG ELECTRONICS CO., LTD., Suwon-si (KR); KOREA ADVANCED INSTITUTE OF SCIENCE AND TECHNOLOGY, Daejeon-si (KR)

(72) Inventors: Hwansoo Suh, Gunpo-si (KR); Insu Jeon, Seoul (KR); Jhinhwan Lee, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 156 days.

(21) Appl. No.: 14/697,038

(22) Filed: Apr. 27, 2015

(65) Prior Publication Data
US 2015/0323347 A1    Nov. 12, 2015

(30) Foreign Application Priority Data
May 9, 2014    (KR) .......................... 10-2014-0055753

(51) Int. Cl.
*G01D 5/12*    (2006.01)
*G01B 7/00*    (2006.01)
(Continued)

(52) U.S. Cl.
CPC .............. *G01D 5/12* (2013.01); *G01B 7/003* (2013.01); *G01Q 10/04* (2013.01); *G01Q 20/04* (2013.01)

(58) Field of Classification Search
USPC ....... 324/649, 207.24; 310/333, 317, 323.02, 310/328, 311, 323.03; 359/824, 221.2;
(Continued)

(56) References Cited

U.S. PATENT DOCUMENTS 3,349,629 A * 10/1967 Elazar ...................... G01L 1/16
310/329
5,208,875 A    5/1993 Virtue et al.
(Continued)

FOREIGN PATENT DOCUMENTS

| JP | 2012-68255 A | 4/2012 |
|---|---|---|
| KP | 10-1137979 B1 | 4/2012 |

OTHER PUBLICATIONS

Furuta Atsushi et al., Impact Driving Actuator; Publication Date: Dec. 7, 2007, JP2007-179341A; Nano Control:KK; G05D3/12.*

Primary Examiner — Melissa Koval
Assistant Examiner — Nasima Monsur
(74) Attorney, Agent, or Firm — Sughrue Mion, PLLC (57) ABSTRACT

A piezoelectric actuator and a method of measuring a motion by using the piezoelectric actuator are provided. The piezoelectric actuator includes: a movable member that is disposed to face the fixed member; a piezoelectric element that is disposed between the fixed member and the movable member, and configured to operate in a shear mode based on input voltages applied to the piezoelectric element and move the movable member relative to the fixed member; and a position sensor that is disposed between the piezoelectric element and the movable member, and configured to measure a motion of the movable member.

12 Claims, 8 Drawing Sheets

(51) Int. Cl.
*G01Q 10/04* (2010.01)
*G01Q 20/04* (2010.01)

(58) Field of Classification Search
USPC .................................... 348/208.1; 360/294.4
See application file for complete search history.

(56) References Cited

U.S. PATENT DOCUMENTS

| | | | | |
|---|---|---|---|---|
| 5,939,816 | A * | 8/1999 | Culp | H01L 41/0825 |
| | | | | 310/328 |
| 6,977,461 | B2 * | 12/2005 | Hendriks | G03F 7/70758 |
| | | | | 310/316.01 |
| 7,075,317 | B2 | 7/2006 | Berting et al. | |
| 7,135,874 | B2 | 11/2006 | Berting et al. | |
| 7,501,835 | B2 * | 3/2009 | Fujiyoshi | G01P 15/0802 |
| | | | | 324/661 |
| 2001/0038515 | A1 * | 11/2001 | Koganezawa | G11B 5/5552 |
| | | | | 360/294.4 |
| 2002/0043894 | A1 * | 4/2002 | Koganezawa | G11B 5/4813 |
| | | | | 310/328 |
| 2006/0001332 | A1 * | 1/2006 | Ollila | H02N 2/008 |
| | | | | 310/317 |
| 2009/0277300 | A1 * | 11/2009 | Matsuki | G01D 5/2412 |
| | | | | 74/99 R |
| 2011/0199696 | A1 * | 8/2011 | Lee | G02B 7/08 |
| | | | | 359/824 |

* cited by examiner

PIEZOELECTRIC ACTUATOR AND METHOD OF MEASURING MOTION BY USING THE SAME

CROSS-REFERENCE TO RELATED APPLICATION

This application claims priority from Korean Patent Application No. 10-2014-0055753, filed on May 9, 2014 in the Korean Intellectual Property Office, the disclosure of which is incorporated herein in its entirety by reference.

BACKGROUND

1. Field

Apparatuses and methods consistent with exemplary embodiments relate to piezoelectric actuators and methods of measuring motions by using the same.

2. Description of the Related Art

A scanning probe microscope (SPM), optical equipment, semiconductor processing equipment, an ultra precision aligner, etc. use a positioner to precisely move an object in a range from several millimeters to several centimeters and to obtain a very precise movement less than several micrometers, preferably, from tens of nanometers to several picometers, within one step. Thus, there is a demand for a simple actuator that may move an object by a small displacement.

SUMMARY

Exemplary embodiments provide piezoelectric actuators including a position sensor.

Exemplary embodiments also provide methods of more precisely measuring a motion by using a piezoelectric actuator including a position sensor.

According to an aspect of an exemplary embodiment, there is provided a piezoelectric actuator including: a fixed member; a movable member that is disposed to face the fixed member; a piezoelectric element that is disposed between the fixed member and the movable member and configured to operate in a shear mode based on input voltages applied to the piezoelectric element and move the movable member relative to the fixed member; and a position sensor that is disposed between the piezoelectric element and the movable member and configured to measure a motion of the movable member.

The position sensor may include a first electrode and a second electrode, wherein the first electrode is fixed to a first region of one surface between the piezoelectric element and the movable member, and the second electrode is fixed to a second region of the one surface.

The position sensor may include a plurality of substrates that are sequentially stacked.

The plurality of substrates may include: a first substrate that includes a first conductive layer that is coated with a conductor; a second substrate that includes a second conductive layer having one surface coated with a conductor having a linear pattern; a third substrate that includes a third conductive layer having one surface coated with a conductor having a circular engraved pattern; and a fourth substrate that includes a fourth conductive layer having one surface divided into regions each being coated with a conductor, wherein the first conductive layer, the second conductive layer, and the third conductive layer are disposed to face the same direction, and the fourth conductive layer is disposed on a surface of the fourth substrate that is spaced apart from the third substrate.

The position sensor may be further configured to measure the motion of the movable member based on a magnitude and a direction of an output voltage that is output from a portion on which the circular engraved pattern is coated.

In response to an output voltage, that is output after the input voltages having different magnitudes and opposite phases are applied, corresponding to 0, the position sensor may be further configured to measure the motion of the movable member based on a ratio of the different magnitudes.

The input voltages have opposite phases and the position sensor may be connected to a voltage applier that is configured to adjust magnitudes of the input voltages.

The second substrate may include a hole that is filled with a conductive material, and the second substrate is connected to the conductive layer of the third substrate through the hole.

The piezoelectric actuator may further include a driving circuit that is configured to measure a current that is output from the position sensor.

The piezoelectric element may include a first piezoelectric layer and a second piezoelectric layer that have different polarization directions.

The piezoelectric actuator may further include an elastic member having one end that contacts the fixed member and another end that elastically presses the movable member toward the piezoelectric element.

According to an aspect of another exemplary embodiment, there is provided a method of measuring a motion, the method including: applying to a position sensor input voltages having a predetermined magnitude and opposite phases; measuring an output voltage that is generated from a motion of a piezoelectric element that is fixed to one surface of the position sensor and output from the position sensor based on the applied voltages; and measuring a motion of a movable member that is fixed to one surface of the position sensor based on the measured output voltage.

The applying the input voltages may include applying the input voltages have a same magnitude, and the measuring the motion may include measuring the motion of the movable member based on a magnitude and a direction of the output voltage.

The applying the input voltages may include applying the input voltages having different magnitudes, and the measuring the motion may include measuring a position of the movable member based on a ratio of the input voltages in response to the output voltage, that is output after the input voltages having different magnitudes and opposite phases are applied, corresponding to 0.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

It will be understood that, although the terms first, second, etc. may be used herein to describe various elements, these elements should not be limited by these terms. These terms are only used to distinguish one element from another.

The terminology used herein is for the purpose of describing exemplary embodiments only and is not intended to be limiting of exemplary embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, parts, or combinations thereof, but do not preclude the presence or addition of one or more other features, integers, steps, operations, elements, parts, or combinations thereof.

Figure 1:
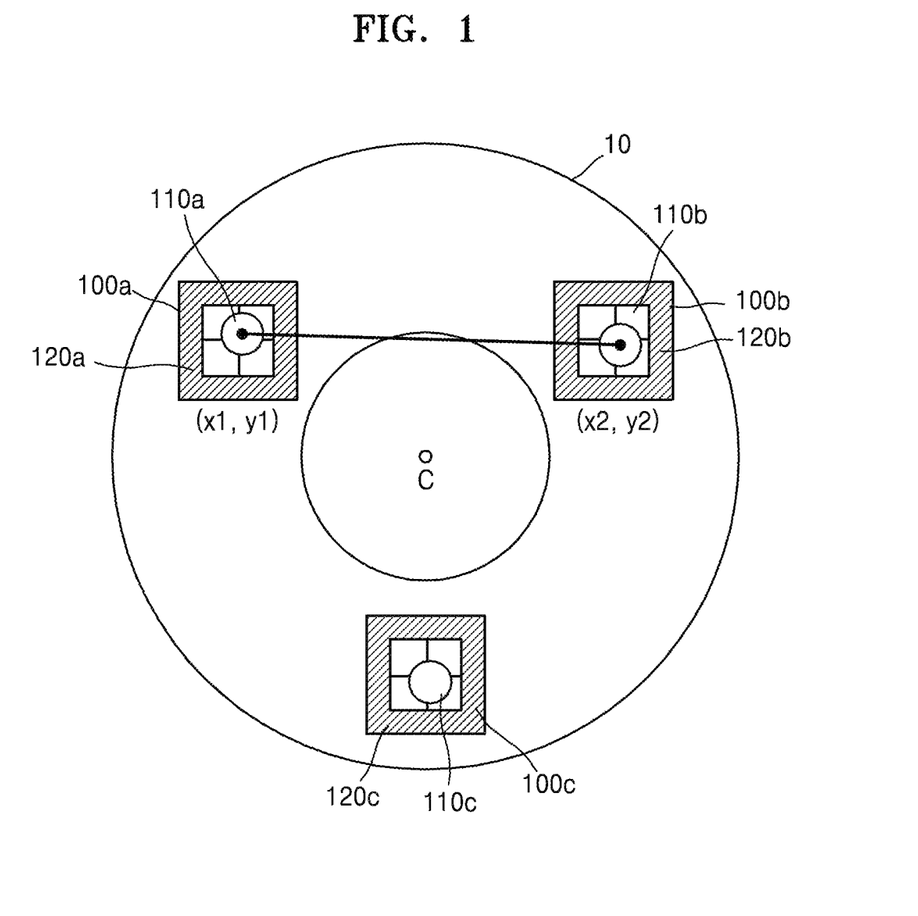
FIG. 1 is a conceptual plan view for explaining piezoelectric actuators including position sensors, according to an exemplary embodiment.

FIG. 1 is a conceptual plan view for explaining piezoelectric actuators 100a, 100b, and 100c including position sensors, according to an exemplary embodiment.

As shown in FIG. 1, the piezoelectric actuators 100a, 100b, and 100c may include a plurality of position sensors and be radially arranged with respect to a central point C. For convenience of explanation, a structure of a piezoelectric actuator and a method of measuring a motion by using the same will be explained based on the piezoelectric actuator 100a including a position sensor 110a.

The piezoelectric actuator 100a includes a fixed member 10, the position sensor 110a, a piezoelectric element 120a, and a movable member (not shown) to which the position sensor 110a is attached. In FIG. 1, the movable member is formed separately from the piezoelectric actuator 100a.

The piezoelectric actuator 100a may more precisely measure a motion of the movable member by using the position sensor 110a integrated with the piezoelectric element 120a. The structure of the piezoelectric actuator 100a in which the position sensor 110a and the piezoelectric element 120a are integrated with each other will be explained below in detail with reference to FIGS. 2 through 4.

The piezoelectric element 120a of FIG. 1 moves the movable member by using a combination of slip and stick motions based on a driving signal. The driving signal may be a sawtooth waveform signal including a part in which a voltage is sharply changed and a part in which a voltage is gradually changed. When the voltage that is sharply changed is applied to the piezoelectric element 120a, the piezoelectric element 120a is deformed while sliding over a surface of the movable member to overcome an inertial force of the movable member and a pressure force applied to the movable member and the fixed member 10. In this case, the movable member does not move. A motion when the piezoelectric element 120a is deformed while sliding in a state where the movable member does not move is referred to as a slip motion.

When the voltage that is gradually changed is applied to the piezoelectric element 120a, the piezoelectric element 120a slowly returns to its original state. In this case, as the piezoelectric element 120 returns to its original state, the movable member moves in a direction in which the piezoelectric element 120 returns to its original shape. A motion when the piezoelectric element 120a that has been deformed returns to its original shape and moves along with the movable member is referred to as a stick motion. As described above, the movable member moves as the slip motion and the stick motion are repeated.

A shape of the driving signal for slip-stick motions is not limited to a sawtooth shape. The driving signal may have any shape as long as it includes a part in which a voltage gradient is sharply changed and a part where a voltage gradient is gradually changed. For example, a cycloidal wave signal or a clipped sinusoidal wave signal marked by one-dashed line may be used as the driving signal.

The position sensor 110a is attached to the movable member and the piezoelectric element 120a of the piezoelectric actuator 100a of FIG. 1. Since the position sensor 110a is located between the piezoelectric element 120a and the movable member, the position sensor 110a may more precisely measure a motion of the movable member. The position sensor 110a measures the motion of the movable member based on an output voltage that corresponds to a voltage that is input to the position sensor 110a. A method performed by the position sensor 110a to measure the motion of the movable member based on the output voltage will be explained below in detail with reference to FIGS. 5 through 9.

Figure 2A:
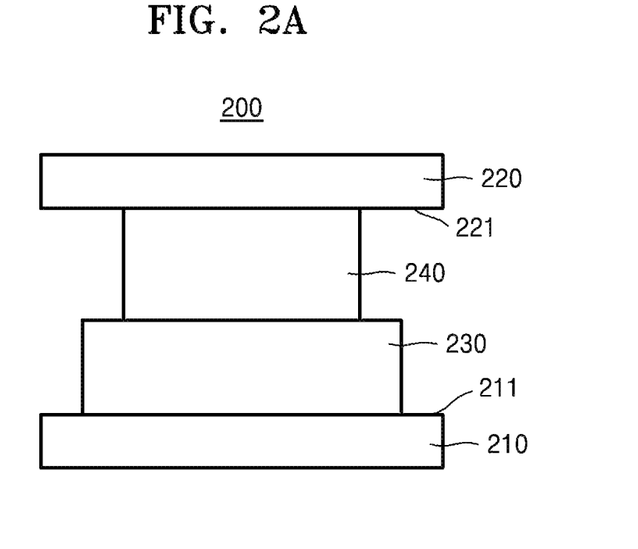
FIGS. 2A and 2B are respectively a cross-sectional view and an exploded perspective view for explaining a structure of a piezoelectric actuator including a position sensor, according to an exemplary embodiment.
Figure 2B:
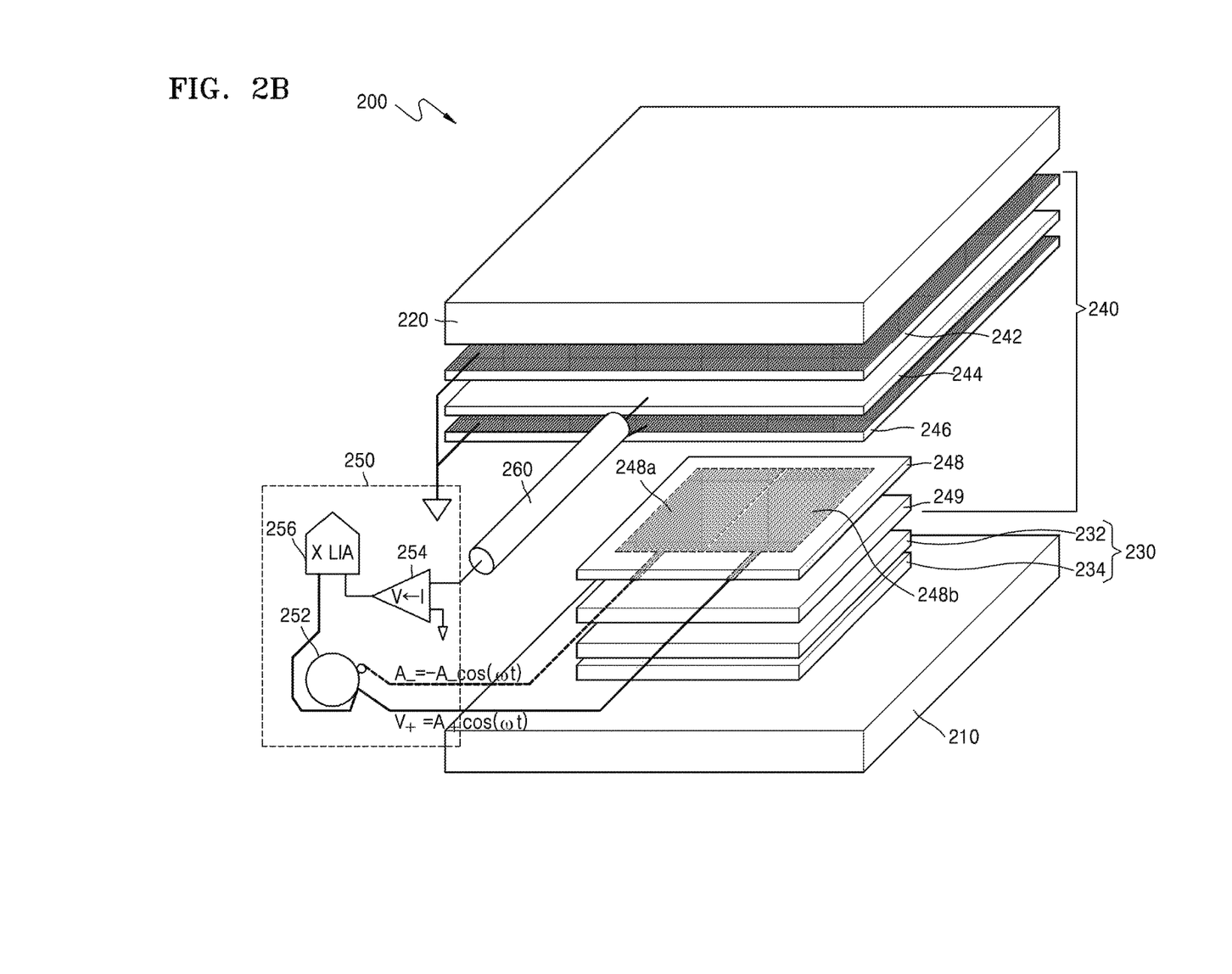

FIGS. 2A and 2B are respectively a cross-sectional view and an exploded perspective view for explaining a structure of a piezoelectric actuator 200 including a position sensor 240, according to an exemplary embodiment.

As shown in FIG. 2A, the piezoelectric actuator 200 includes a fixed member 210, a movable member 220, a piezoelectric element 230, and the position sensor 240. FIG.

2B illustrates a detailed structure of each element of the piezoelectric actuator 200 of FIG. 2A. The piezoelectric actuator 200 will now be explained with reference to FIGS. 2A and 2B.

The fixed member 210 and the movable member 220 are spaced apart from each other and face each other. The piezoelectric element 230 is disposed between surfaces 211 and 221 of the fixed member 210 and the movable member 220. The piezoelectric element 230 may be adhered to the surface 211 of the fixed member 210 by using an adhesive. Examples of the adhesive may include an epoxy-based adhesive and a solvent evaporation-type adhesive. At least one piezoelectric element 230 may be disposed between the fixed member 210 and the movable member 220. The position sensor 240 is disposed between the movable member 220 and the piezoelectric element 230. That is, as the piezoelectric element 230 is integrated with the position sensor 240, the piezoelectric element 230 may be used to measure a motion of the movable member 220.

The movable member 220 may contact the piezoelectric element 230 with friction by applying a force to the piezoelectric element 230 due to its weight. Also, an elastic member (not shown) that presses the movable member 220 on the piezoelectric element 230 may be provided. The elastic member may be a leaf spring having one end that is fixed to the fixed member 210 and other end that elastically contacts the movable member 220. Also, the movable member 220 may press the piezoelectric element 230 by a magnetic force. For example, a magnet may be provided on the fixed member 210 and may press the piezoelectric element 230 by attracting the movable member 220 formed of a magnetic material.

The piezoelectric element 230 operates in a shear mode as described above with reference to FIG. 1. The piezoelectric element 230 operates in a shear mode based on a driving voltage that is applied to the piezoelectric element 230, and moves the movable member 220 relative to the fixed member 210. The shear mode may refer to a status of the piezoelectric element 230 which is under a shear stress.

As shown in FIG. 2B, the piezoelectric element 230 may include first and second piezoelectric layers 232 and 234 that are sequentially stacked. A common electrode (not shown) may be disposed between the first and second piezoelectric layers 232 and 234, and driving electrodes (not shown) may be respectively provided on a top surface and a bottom surface of the first and second piezoelectric layers 232 and 234. Polarization directions of the first and second piezoelectric layers 232 and 234 are opposite each other. For example, the polarization direction of the first piezoelectric layer 232 may be from a central point of the piezoelectric element 230 to the outside of the piezoelectric element 230, and the polarization direction of the second piezoelectric layer 234 may be from the outside of the piezoelectric element 230 to the central point of the piezoelectric element 230. In other words, if the polarization direction of the first piezoelectric layer 232 is in a positive direction of an x-axis, the polarization direction of the second piezoelectric layer 234 corresponds to a negative direction of the x-axis. Examples of a piezoelectric material may include a lead zirconate titanate (PZT) ceramic material, $BaTiO_3$, $PbTiO_3$, $KNbO_3$, $LiNbO_3$, $LiTaO_3$, $Na_2WO_3$, $Zn_2O_3$, $Ba_2NaNb_5O_5$, $Pb_2KNb_5O_{15}$, $BiFeO_3$, $NaNbO_3$, $Bi_4Ti_3O_{12}$, and $Na_{0.5}Bi_{0.5}TiO_3$.

As shown in FIG. 2B, the position sensor 240 may include a first substrate 242, a second substrate 244, a third substrate 246, a fourth substrate 248, a fifth substrate 249, and a driver 250. The position sensor 240 may measure a position of the movable member 220 based on a change in the amount of an electric charge which occurs as a substrate that contacts the movable member 220 from among the first through fifth substrates 242, 244, 246, 248, and 249 moves. The substrate that contacts the movable member 220 may vary according to a structure of the piezoelectric actuator 200. A structure of the position sensor 240 will now be explained in detail with reference to FIG. 2B.

Each substrate included in the position sensor 240 is formed of a material having high insulating properties. For example, each substrate may be formed of sapphire. A side surface of each substrate may be coated with a metal. For example, the first substrate 242 may include a first conductive layer whose top surface is coated with a metal. The second substrate 244 may include a second conductive layer whose top surface is coated with a metal having a linear pattern. A circular engraved pattern may be formed on a top surface of the third substrate 246. For example, the third substrate 246 may include a third conductive layer whose top surface has a portion on which the circular engraved pattern is formed and another portion coated with a metal. The first substrate 242, the second substrate 244, and the third substrate 246 may be adhered to each other.

A ground wire is connected to the first substrate 242 and the third substrate 246. Also, a wire for connecting each substrate to the driver 250 that may measure a change in the amount of the electric charge which occurs as the piezoelectric element 230 is deformed and the movable member 220 moves is provided on the second substrate 244 and the third substrate 246.

A hole is formed in the center of the second substrate 244 and is filled with a conductor. The second substrate 244 may receive a current that is generated as the movable member 220 moves and thus the amount of the electric charge between the third substrate 246 and the fourth substrate 248 is changed. A wire that connects the second substrate 244 and the third substrate 246 to the driver 250 is surrounded by an insulator 260.

One surface of the fourth substrate 248 may be divided into first and second regions 248a and 248b and each of the first and second regions 248a and 248b may include a conductive layer coated with a conductor. The one surface of the fourth substrate 248 may be a bottom surface that does not contact the third substrate 246. The first region 248a of the fourth substrate 248 that is coated with the conductor may be connected to a first electrode of the driver 250 and the second region 248b of the fourth substrate 248 may be connected to a second electrode of the driver 250.

The position sensor 240 may measure a position of the movable member 220 by measuring a change in the amount of the electric charge between the third substrate 246 and the fourth substrate 248 which occurs as the movable member 220 moves.

One surface of the fifth substrate 249 contacts the fourth substrate 248. As shown in FIG. 2B, the one surface of the fifth substrate 249 contacts the fourth substrate 248 and the other surface of the fifth substrate 249 contacts the piezoelectric element 230.

The driver 250 includes a voltage applier 252 that applies a voltage to the fourth substrate 248. For example, the voltage applier 252 may apply voltages having opposite phases to the fourth substrate 248. Also, the driver 250 may measure a change in the amount of an electric charge that is output as the movable member 220 moves. The driver 250 may include a converter 254 that converts a current that is output as the amount of the electric charge is changed into a voltage. The driver 250 may include a measurer 256 that measures a voltage that is output through the converter 254. The measurer 256 may be a voltage meter. A lock-in amplifier (LIA) may be used as the measurer 256.

Figure 3:
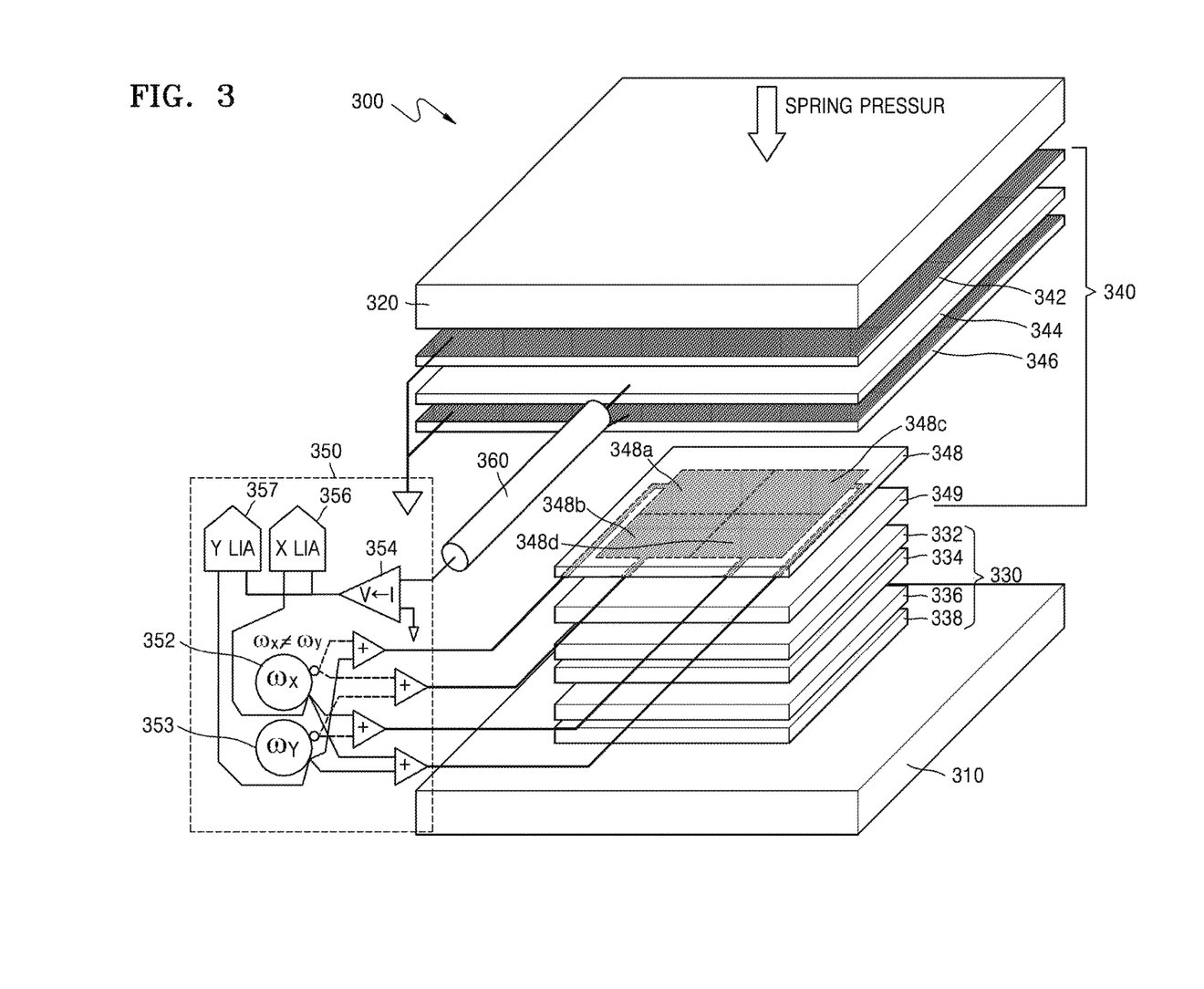
FIG. 3 is an exploded perspective view for explaining a structure of a piezoelectric actuator including a position sensor, according to another exemplary embodiment.

FIG. 3 is an exploded perspective view for explaining a structure of a piezoelectric actuator 300 including a position sensor 340, according to another exemplary embodiment.

As shown in FIG. 3, the piezoelectric actuator 300 includes a fixed member 310, a movable member 320, a piezoelectric element 330, and the position sensor 340. Each element included in the piezoelectric actuator 300 of FIG. 3 may functionally correspond to each element included in the piezoelectric actuator 200 of FIGS. 2A and 2B.

As shown in FIG. 3, the piezoelectric element 330 may include a first piezoelectric layer 332, a second piezoelectric layer 324, a third piezoelectric layer 336, and a fourth piezoelectric layer 338 which are sequentially stacked. The first and second piezoelectric layers 332 and 334 and the third and fourth piezoelectric layers 336 and 338 may be polarized along different axes. For example, polarizations of the first and second piezoelectric layers 332 and 334 may occur along an X-axis. A polarization direction of the first piezoelectric layer 332 may be from a central point of the piezoelectric element 330 to the outside of the piezoelectric element 330 along the X-axis, and a polarization direction of the second piezoelectric layer 334 may be from the outside of the piezoelectric element 330 to the central point of the piezoelectric element 330 along the X-axis.

Also, the third and fourth piezoelectric layers 336 and 338 may be polarized along a Y-axis. A polarization direction of the third piezoelectric layer 336 may be from the central point of the piezoelectric element 330 to the outside of the piezoelectric element 330 along the Y-axis, and a polarization direction of the fourth piezoelectric layer 338 may be from the outside of the piezoelectric element 330 to the central point of the piezoelectric element 330.

Although the polarization directions of the first and second piezoelectric layers 332 and 334 and the third and fourth piezoelectric layers 336 and 338 are described as an X-axis direction and an Y-axis direction, respectively, the polarization directions may be also described as a horizontal direction and an vertical direction.

As shown in FIG. 3, the position sensor 340 may include a first substrate 342, a second substrate 344, a third substrate 346, a fourth substrate 348, a fifth substrate 349, and a driver 350. The position sensor 340 may measure a position of the movable member 320 based on a change in the amount of an electric charge which occurs as a substrate that contacts the movable member 320 from among the first through fifth substrates 342, 344, 346, 348, and 349 moves. The substrate that contacts the movable member 320 may vary according to a structure of the piezoelectric actuator 300.

Each element included in the position sensor 340 of FIG. 3 may functionally correspond to each element included in the position sensor 340 of FIG. 2B.

However, the fourth substrate 348 included in the position sensor 340 of FIG. 3 may be divided into four regions, that is, first through fourth regions 348a, 348b, 348c, and 348d, and each of the first through fourth regions 348a, 348b, 348c, and 348d may include a conductive layer coated with a conductor. One surface of the fourth substrate 348 may be a bottom surface that does not contact the third substrate 346. The first region 348a coated with the conductor of the fourth substrate 348 may be connected to a first electrode of a first voltage applier 352 of the driver 350 which applies a voltage having a first frequency, and the second region 348b of the fourth substrate 348 may be connected to a second electrode of the first voltage applier 352 of the driver 350 which applies a voltage having a first frequency. The first electrode and the second electrode may have different phases.

The third region 348c may be connected to a first electrode of a second voltage applier 343 of the driver 350 which applies a voltage having a second frequency, and the fourth region 349c may be connected to a second electrode of the second voltage applier 353 of the driver 350 which applies a voltage having a second frequency. The first electrode and the second electrode may have different phases.

The piezoelectric actuator 300 may include a plurality of measurers, for example, first and second measurers 356 and 357. An LIA may be used as each of the first and second measurers 356 and 357. The first and second measurers 356 and 357 may measure a voltage that is output from the fourth substrate 348 according to voltages having different frequencies applied to the fourth substrate 348. For example, the first measurer 356 may measure a voltage having a first frequency that is output from the fourth substrate 348. The first measurer 356 may measure a position of the movable member 320 on the X-axis based on the output voltage having the first frequency.

Also, the second measurer 357 may measure a voltage that has a second frequency and is output from the fourth substrate 348. The second measurer 357 may measure a position of the movable member 320 on the Y-axis based on the output voltage having the second frequency.

The piezoelectric actuator 300 may determine a position of the movable member 320 on a two-dimensional (2D) plane based on the positions of the movable member 320 on the X-axis and the Y-axis respectively measured by the first and second measurers 356 and 357.

Figure 4:
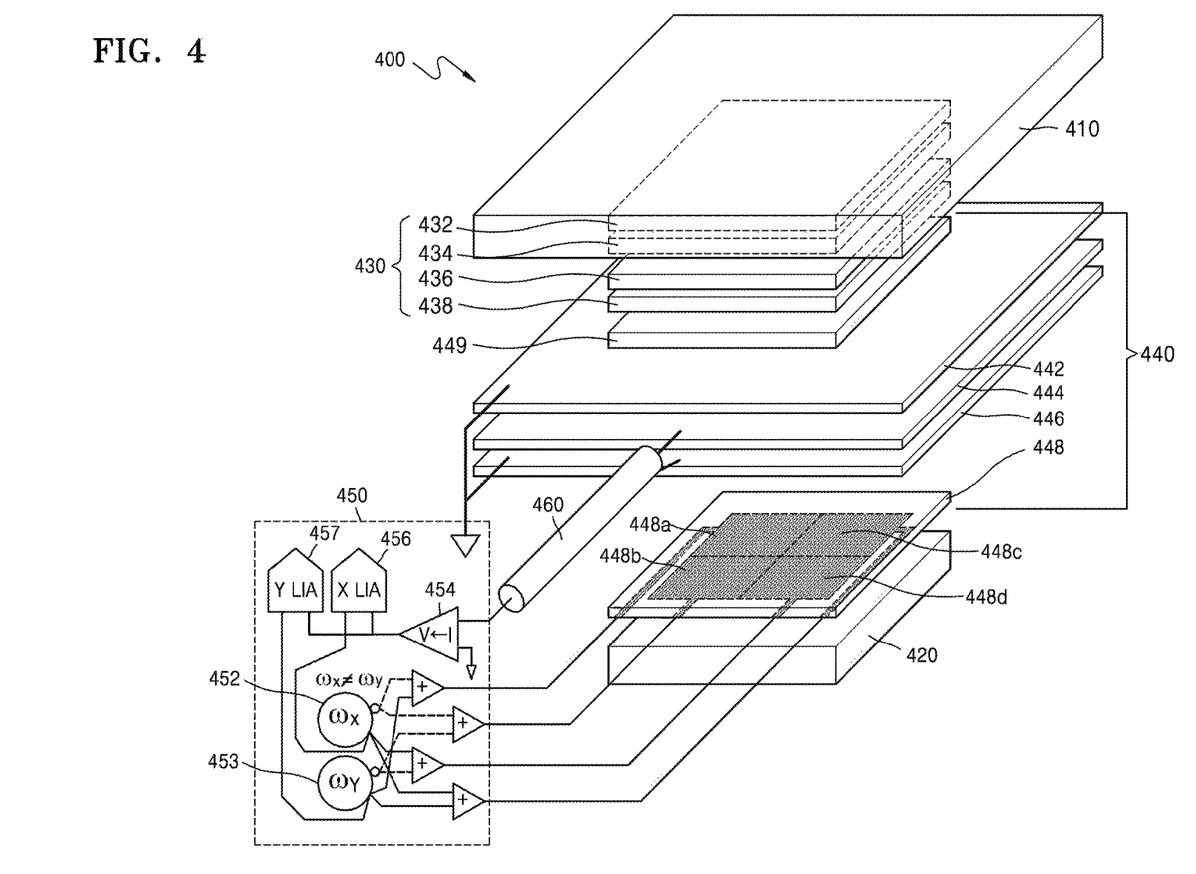
FIG. 4 is an exploded perspective view for explaining a structure of a piezoelectric actuator including a position sensor, according to another exemplary embodiment.

FIG. 4 is an exploded perspective view for explaining a structure of a piezoelectric actuator 400 including a position sensor 440, according to another exemplary embodiment.

As shown in FIG. 4, the piezoelectric actuator 400 includes a fixed member 410, a movable member 420, a piezoelectric element 430, and the position sensor 440. Each element included in the piezoelectric actuator 400 of FIG. 4 may functionally correspond to each element included in the piezoelectric actuator 300 of FIG. 3.

The fixed member 410 and the movable member 420 are spaced apart from each other and face each other. The piezoelectric element 430 is disposed between surfaces 411 and 421 of the fixed member 410 and the movable member 420. The piezoelectric element 430 may be adhered to the surface 411 of the fixed member 410. At least one piezoelectric element 430 may be disposed between the fixed member 410 and the movable member 420. The position sensor 420 is disposed between the movable member 420 and the piezoelectric element 430. That is, the position sensor 440 may be used to measure a motion of the movable member 420 by being integrated with the piezoelectric element 430.

The movable member 420 may frictionally contact the piezoelectric element 230 with due to a force that is applied to the piezoelectric element 430. The piezoelectric element 430 operates in a shear mode as described above with reference to FIG. 1. The piezoelectric element 430 operates in a shear mode based on a driving voltage that is applied to the piezoelectric element 430, and moves the movable member 420 relative to the fixed member 410.

As shown in FIG. 4, the piezoelectric element 430 may include a first piezoelectric layer 432, a second piezoelectric layer 434, a third piezoelectric layer 436, and a fourth piezoelectric layer 438 that are sequentially stacked. In the first and second piezoelectric layers 432 and 434 and the third and fourth piezoelectric layers 436 and 438, polarizations occur along different axes.

The position sensor 440 may include a first substrate 442, a second substrate 444, a third substrate 446, a fourth substrate 448, a fifth substrate 449, and a driver 450. The position sensor 440 may measure a position of the movable member 420 based on a change in the amount of an electric charge which occurs as a substrate that contacts the movable member 420 from among the first through fifth substrates 442, 444, 446, 448, and 449 moves. The substrate that contacts the movable member 420 may vary according to a structure of the piezoelectric actuator 400. A structure of the position sensor 440 will now be explained with reference to FIG. 4.

Each substrate included in the position sensor 440 is formed of a material having high insulating properties. For example, each substrate may be formed of sapphire. One surface of each substrate may be coated with a metal. For example, the first substrate 442 may include a first conductive layer whose top surface is coated with a metal. The second substrate 444 may include a second conductive layer whose top surface is coated with a metal having a linear pattern. A circular engraved pattern may be formed on a top surface of the third substrate 446. For example, the third substrate 446 may include a third conductive layer whose top surface a portion on which the circular engraved pattern is formed and another portion coated with a metal. The first substrate 442, the second substrate 444, and the third substrate 446 may be adhered to each other.

One surface of the fourth substrate 448 may be divided into four regions, that is, first through fourth regions 448a, 448b, 448c, and 448d, and each of the first through fourth regions 448a, 448b, 448c, and 448d may include a conductive layer coated with a conductor. As shown in FIG. 4, the one surface of the fourth substrate 448 may be a bottom surface that does not contact the third substrate 446. The fifth substrate 449 may not include a conductive layer, unlike the first through fourth substrates 442, 444, 446, and 448. A structure in which the first through fifth substrates 442, 444, 446, 448, and 449 are sequentially stacked will now be explained.

The first substrate 442, the second substrate 444, the third substrate 446, and the fifth substrate 449 are adhered to each other. Unlike in FIG. 3, the fifth substrate 449 of the piezoelectric actuator 400 of FIG. 4 contacts one surface of the first substrate 442.

The fifth substrate 449 is attached to one surface of the piezoelectric element 430. The fifth substrate 449 may be adhered to the one surface of the piezoelectric element 430. The other surface of the piezoelectric element 430 that does not contact the fifth substrate 449 is connected to the fixed member 410. The other surface of the piezoelectric element 430 that does not contact the fifth substrate 449 may be adhered to the fixed member 410.

As shown in FIG. 4, one surface of the fourth substrate 448 is connected to the movable member 420. The fourth substrate 448 may be adhered to the movable member 420.

The piezoelectric actuator 400 may measure a position of the movable member 420 based on a change in the amount of an electric charge between the third substrate 446 and the fourth substrate 448 which occurs as the movable member 420 moves.

In detail, the first region 448a of the fourth substrate 448 which is coated with the conductor may be connected to a first electrode of a first voltage applier 452 of the driver 450 which applies a voltage having a first frequency, and the second region 448b of the fourth substrate 448 may be connected to a second electrode of the first voltage applier 452 of the driver 450 which applies a voltage having a first frequency. The first electrode and the second electrode may have different phases.

The third region 448c may be connected to a first electrode of a second voltage applier 453 of the driver 450 which applies a voltage having a second frequency, and the fourth region 448d may be connected to a second electrode of the second voltage applier 453 of the driver 450 which applies a voltage having a second frequency. The first electrode and the second electrode may have different phases.

The piezoelectric actuator 400 may include a plurality of measurers, for example, first and second measurers 456 and 457. An LIA may be used as each of the first and second measurers 456 and 457. The first and second measurers 456 and 457 may measure a voltage that is output according to voltages having different frequencies applied to the fourth substrate 448. For example, the first measurer 456 may measure a voltage that has a first frequency and is output from the fourth substrate 448. The first measurer 456 may measure a position of the movable member 420 on an X-axis based on the output voltage having the first frequency.

Also, the second measurer 457 may measure a voltage having a second frequency that is output from the fourth substrate 448. The second measurer 457 may measure a position of the movable member 420 on a Y-axis based on the output voltage having the second frequency.

The piezoelectric actuator 400 may determine a position of the movable member 420 on a 2D plane based on the positions of the movable member 420 on the X-axis and the Y-axis respectively measured by the first and second measurers 456 and 457.

Figure 5:
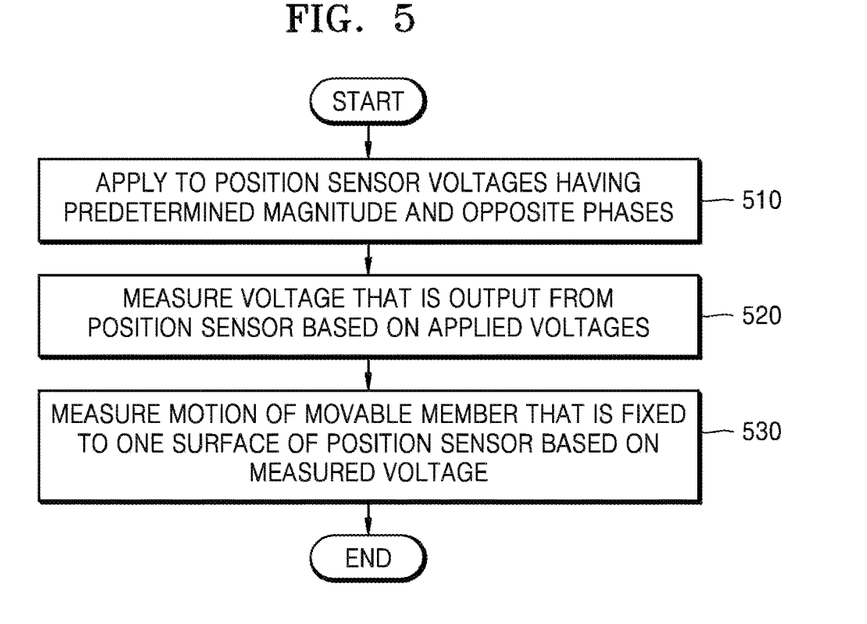
FIG. 5 is a flowchart illustrating a method performed by the piezoelectric actuator including the position sensor to measure a motion, according to an exemplary embodiment.

FIG. 5 is a flowchart illustrating a method performed by the piezoelectric actuator 200 including the position sensor 240 to measure a motion, according to an exemplary embodiment.

In operation 510, voltages having opposite phases are applied to the position sensor 240 of the piezoelectric actuator 200. Voltages having a preset magnitude and opposite phases may be applied to the position sensor 240. Electric charge may be generated in the position sensor 240 based on the applied voltages.

In FIG. 5, the voltages applied to the position sensor 240 may be generated in the piezoelectric actuator 200. However, this is exemplary, and the position sensor 240 may receive voltages from an external actuator.

In operation 520, the piezoelectric actuator 200 measures a voltage that is output from the position sensor 240 based on the applied voltages. When the voltages are applied to the position sensor 240, a current may output due to the generated electric charge. The piezoelectric actuator 200 converts the output current into a voltage and measures the voltage.

In FIG. 5, when the movable member 220 that is included in the piezoelectric actuator 200 moves, the amount of an electric charge in the position sensor 240 that is connected to the movable member 220 is changed. In this case, the amount of the output current is changed, and the measured voltage may also be changed. For example, the position sensor 240 may include the first through fifth substrates 242, 244, 246, 248, and 249, and the amount of the electric charge between the third substrate 246 whose top surface has the circular engraved pattern and the fourth substrate 248 to which the voltages are applied is changed. That is, as the movable member 220 moves, a current is output based on the change in the amount of the electric charge in the position sensor 2740 to which the voltages are applied.

A motion of the movable member 220 is generated from a motion of the piezoelectric element 230 that is fixed to the other surface of the position sensor 240.

In operation 530, the piezoelectric actuator 200 measures a motion of the movable member 220 based on the measured voltage.

The piezoelectric actuator 200 may measure a position of the movable member 220 corresponding to a value of the measured voltage. The piezoelectric actuator 200 may measure a position of the movable member 220 on a 2D plane. For example, when voltages having different frequencies are applied to the piezoelectric actuator 200, the piezoelectric actuator 200 may measure a position of the movable member 220 on an X-axis and a position of the movable member 200 on a Y-axis.

A relationship between a voltage measured by the piezoelectric actuator 200 and a position of the movable member 220 may vary according to the applied voltages. A method performed by the piezoelectric actuator 200 to measure a motion based on an output voltage will be explained in detail with reference to FIGS. 6 through 9.

Figure 6:
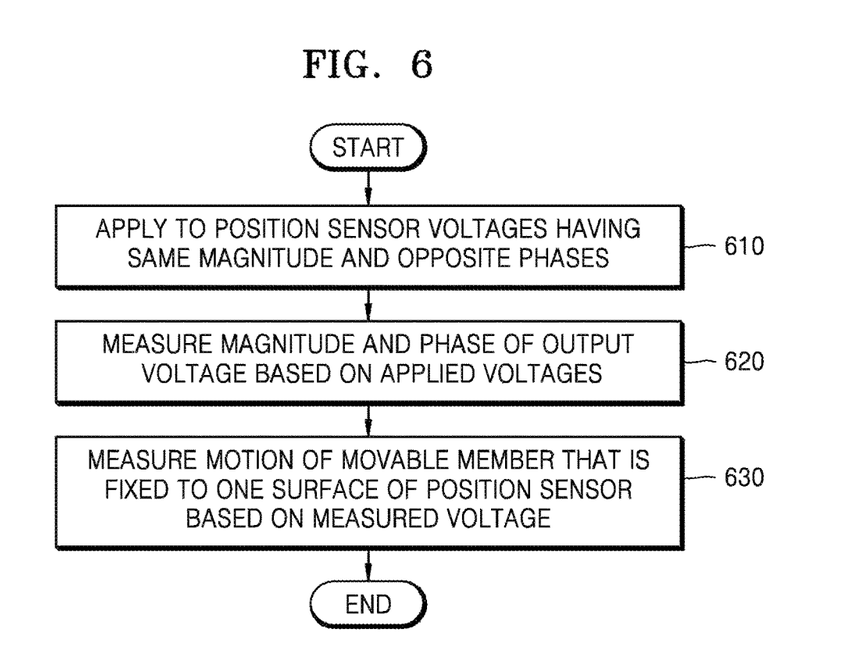
FIG. 6 is a flowchart illustrating a method performed by the piezoelectric actuator to measure a motion by applying voltages having the same magnitude and different phases.

FIG. 6 is a flowchart illustrating a method performed by the piezoelectric actuator 200 to measure a motion by applying voltages having the same magnitude and different phases, according to another exemplary embodiment.

In operation 610, voltages having the same magnitude and opposite phases are applied to the position sensor 240 of the piezoelectric actuator 200. For example, voltages having a magnitude of A and opposite phases may be applied to the first region 248a and the second region 248b of the fourth substrate 248 that is included in the position sensor 240.

In operation 620, the piezoelectric actuator 200 measures a magnitude and a phase of an output voltage based on the voltages that are applied to the position sensor 240, which will now be explained in detail with reference to FIG. 7.

Figure 7:
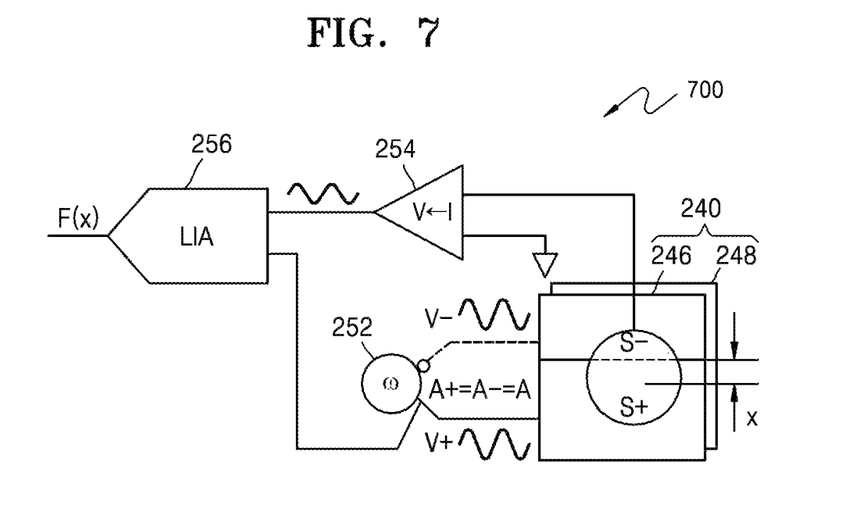
FIG. 7 is a diagram illustrating a circuit of the piezoelectric actuator that measures a motion by applying voltages according to the method of FIG. 6.

FIG. 7 is a diagram illustrating a circuit of the piezoelectric actuator 200 that measures a motion by applying voltages according to the method of FIG. 6.

The position sensor 240 and the driver 250 of the piezoelectric actuator 200 are illustrated in FIG. 7. Only the third substrate 246 and the fourth substrate 248 of the position sensor 240 are illustrated in FIG. 7 for convenience of explanation.

Voltages +A and −A having a magnitude of A and different phases are applied from the driver 250 to the position sensor 240. In detail, the voltage +A is applied to the first region 248a of the fourth substrate 248 that is included in the position sensor 240 and the voltage −A is applied to the second region 248b of the fourth substrate 248 that is included in the position sensor 240. The voltages +A and −A applied to the first and second regions 248a and 248B may be determined by using Equation 1.

$$V_+ = A\cos(wt), V_- = -A\cos(wt) \tag{1}$$

When the piezoelectric element 230 of the piezoelectric actuator 200 is deformed, the movable member 220 that is disposed to face the piezoelectric element 230 moves as described above with reference to FIG. 2.

When the movable member 220 moves, the third substrate 246 that contacts one surface of the movable member 220 moves. As shown in FIG. 2, the first substrate 242, the second substrate 244, and the third substrate 246 are adhered to the one surface of the movable member 220. A portion of one surface of the third substrate 246 other than a portion having the circular engraved pattern is coated with a conductor.

An electric charge is generated between the third substrate 246 and the fourth substrate 248 that contacts the third substrate 246 due to the voltages +A and −A applied to the fourth substrate 248. The electric charge generated due to the voltage +A and the electric charge generated due to the voltage −A have different polarities.

As the movable member 220 moves and thus the third substrate 246 moves, the amount of the electric charge that is generated in the circular engraved pattern may be changed. For example, before the movable member 220 moves, a border line between the first and second regions 248a and 248b of the fourth substrate 248 is attached to correspond to the center of the circular engraved pattern formed on the third substrate 246. In this case, electric charges having the same magnitude and different phases are generated between the circular engraved pattern formed on the third substrate 246 and the first and second regions 248a and 248b.

When the movable member 220 moves, the border line between the first and second regions 248a and 248b of the fourth substrate 248 deviates from the center of the circular engraved pattern formed on the third substrate 246. In this case, a contact area between the circular engraved pattern formed on the third substrate 246 and the first region 248a and a contact area between the circular engraved pattern and the second region 248b are different from each other, and thus, electric charges having different magnitudes and different polarities are generated. Accordingly, the total amount of the electric charge is different from that before the movement of the movable member 220, and thus, a current is generated.

The converter 254 that is included in the driver 250 converts the current that is output from the position sensor 240 into a voltage. The measurer 256 that is included in the driver 250 measures the voltage. The measured voltage may be determined by using Equation 2.

$$V_0 = \frac{Rw\varepsilon A}{d}(S_+(x) - S_-(x))\sin(wt). \tag{2}$$

In Equation 2, $V_0$ is an output voltage, R is a resistance coefficient that is used by the converter 254 to convert current that is output from the position sensor 240 into a voltage, w is a frequency of an applied voltage, A is a magnitude of the applied voltage, and d is a value obtained by summing thicknesses of the third substrate 246 and the fourth substrate 248. Also, $S_+(x)$ and $S_-(x)$ are respectively a contact area between the first region 248a and the circular engraved pattern and a contact area between the second region 248b and the circular engraved pattern. $\sin(wt)$ may be derived from voltages $+A\cos(wt)$ and $-A\cos(wt)$ that are applied to the position sensor 240.

The contact areas $S_+(x)$ and $S_-(x)$ may be determined by using Equation 3.

$$S_+(x) = \left(\sin^{-1}\left(\frac{x}{a}\right) + \frac{\pi}{2}\right)a^2 + x\sqrt{a^2 - x^2} \tag{3}$$
$$S_-(x) = \left(\cos^{-1}\left(\frac{x}{a}\right)\right)a^2 - x\sqrt{a^2 - x^2}.$$

In Equation 3, a is a length of a radius of the circular engraved pattern, and x is a distance between a border line between the first region 248a and the second region 248b and the center of the circular engraved pattern.

As indicated in Equations 2 and 3, the output voltage $V_O$ depends on $$\frac{Rw\varepsilon A}{d}.$$

Alternatively, when the fourth substrate 248 is divided into four regions, four voltages having different frequencies and different phases may be respectively applied to the four regions as described above with reference to FIG. 3.

With reference back to FIG. 6, in operation 630, the piezoelectric actuator 200 measures a motion of the movable member 220 that is fixed to one surface of the position sensor 240 based on the measured voltage. As described above with reference to FIG. 7, a distance between a border line between the first region 248a and the second region 248b and the center of the circular engraved pattern may be calculated based on the output voltage. A position of the movable member 220 may be measured based on the distance.

Figure 8:
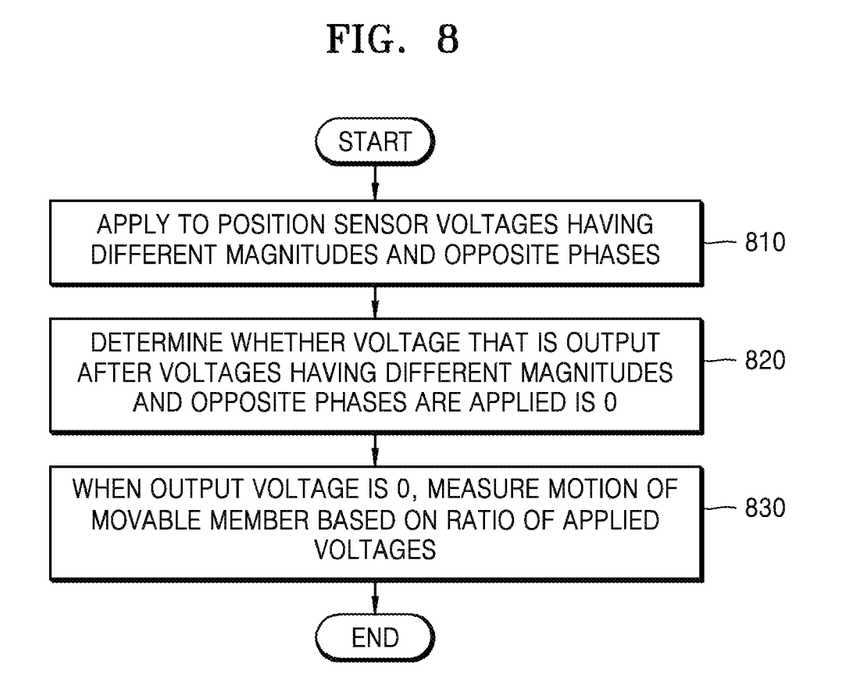
FIG. 8 is a flowchart illustrating a method performed by the piezoelectric actuator to measure a motion by applying voltages having different magnitudes and phases, according to another exemplary embodiment.

FIG. 8 is a flowchart illustrating a method performed by the piezoelectric actuator 200 to measure a motion by applying voltages having different magnitudes and different phases, according to another exemplary embodiment.

In operation 810, voltages having magnitudes of a preset ratio and opposite phases are applied to the position sensor 240 of the piezoelectric actuator 200. For example, a voltage +Av may be applied to the first region 248a of the fourth substrate 248 that is included in the position sensor 240, and a voltage −A(1−v) may be applied to the second region 248b of the fourth substrate 248 that is included in the position sensor 240. The voltages +Av and −A(1−v) applied to the first and second regions 248a and 248b may be determined by using Equation 4.

$$V_+ = +Av\cos(wt), V_- = -A(1-v)\cos(wt) \quad (4).$$

In Equation 4, v is a preset ratio.

In operation 820, the piezoelectric actuator 200 determines whether an output voltage is 0 based on the voltages that are applied to the position sensor 240, which will now be explained in detail with reference to FIG. 9.

Figure 9:
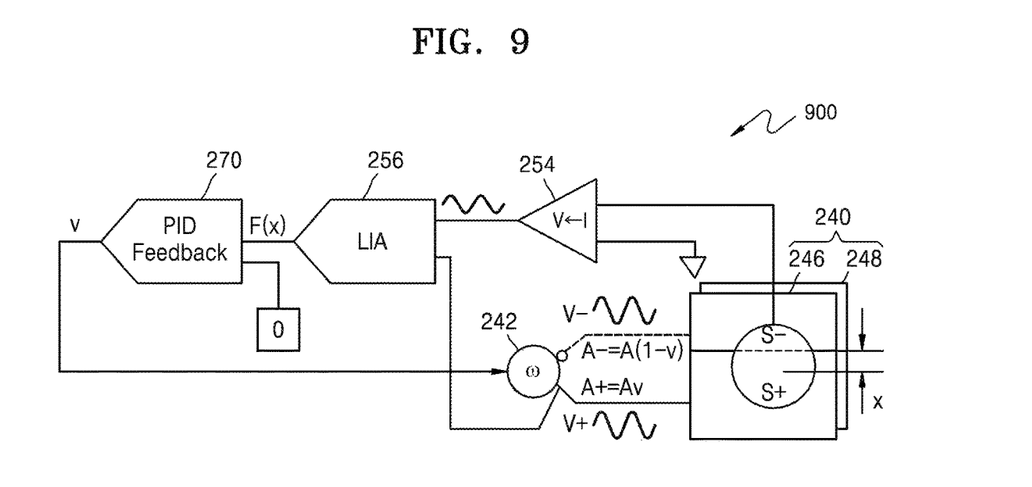
FIG. 9 is a diagram illustrating a circuit of the piezoelectric element that measures a motion by applying voltages according to the method of FIG. 8.

FIG. 9 is a diagram illustrating a circuit of the piezoelectric actuator 200 that measures a motion by applying voltages according to the method of FIG. 8.

In FIG. 9, the position sensor 240 and the driver 250 of the piezoelectric actuator 200 are illustrated. Also, as shown in FIG. 9, the piezoelectric actuator 200 may further include a feedback unit 270. Only the third substrate 246 and the fourth substrate 248 of the position sensor 240 are illustrated in FIG. 9 for convenience of explanation in FIG. 7.

Voltages +Av and −A(1−v) having magnitudes of Av and A(1−v) and different phases are applied from the driver 250 to the position sensor 240. In detail, the voltage +Av is applied to the first region 248a of the fourth substrate 248 that is included in the position sensor 240 and the voltage −A(1−v) is applied to the second region 248b of the fourth substrate 248 that is included in the position sensor 240.

When the piezoelectric element 230 of the piezoelectric actuator 200 is deformed, the movable member 220 that is disposed to face the piezoelectric element 230 moves as described above with reference to FIG. 2. Assuming that a voltage is generated as the movable member 220 moves, the piezoelectric actuator 200 changes a preset ratio v to allow an output voltage to be 0.

The piezoelectric actuator 200 may measure a position of the movable member 220 from the preset ratio v that allows the output voltage to be 0. The position of the movable member 220 is determined by using Equation 5.

$$V_0 = \frac{Rw\varepsilon}{d}(AvS_+(x) - A(1-v)S_-(x))\sin(wt). \quad (5)$$

In Equation 5, $V_0$ is an output voltage, R is a resistance coefficient that is used by the converter 254 to convert current that is output from the position sensor 240 into a voltage, w is a frequency of each applied voltage, Av and A(1−v) are magnitudes of voltages applied at a preset ratio v, and d is a value obtained by summing thicknesses of the third substrate 246 and the fourth substrate 248. Also, $S_+(x)$ and $S_-(x)$ are respectively a contact area between the first region 248a and the circular engraved pattern and a contact area between the second region 248b and the circular engraved pattern. In addition, sin(wt) may be derived from voltages +Av cos(wt) and −A(1−v)cos(wt) that are applied to the position sensor 240. The contact areas $S_+(x)$ and $S_-(x)$ may be determined by using Equation 3.

When the preset ratio v when the output voltage is 0 is calculated based on Equations 3 and 5, a position of the movable member 220 that moves may be determined by using Equations 6 and 7.

$$V_0 = \frac{Rw\varepsilon}{d}(AvS_+(x) - A(1-v)S_-(x))\sin(wt) \quad (6)$$
$$= \frac{Rw\varepsilon A}{d}(\pi a^2 v - S_-(x))\sin(wt)$$
$$= 0.$$

$$\pi a^2 v = S_-(x) = \left(\cos^{-1}\left(\frac{x}{a}\right)\right)a^2 - x\sqrt{a^2 - x^2}. \quad (7)$$

In Equation 7, a is a length of a radius of the circular engraved pattern, and x is a distance between a border line between the first region 248a and the second region 248b and the center of the circular engraved pattern.

As shown in Equation 7, the distance x between the border line between the first region 248a and the second region 248b and the center of the circular engraved pattern may be obtained by detecting the preset ratio v that allows the output voltage to be 0 without depending on output $$\frac{Rw\varepsilon A}{d}.$$

Alternatively, when the fourth substrate 248 is divided into four regions, four voltages having different frequencies and different phases may be applied to the four regions as described above with reference to FIG. 3.

With reference back to FIG. 8, in operation 830, the piezoelectric actuator 200 measures a motion of the movable member 220 that is fixed to one surface of the position sensor 240 based on a ratio of the measured voltages. As described above with reference to FIG. 9, a distance between a border line between the first region 248a and the second region 248b and the center of the circular engraved pattern may be calculated based on the preset ratio v of the applied voltages that allows the output voltage to be 0. A position of the movable member 220 may be measured based on the calculated distance.

As shown in FIG. 9, when the voltage measured by the measurer 256 included in the position sensor 240 is not 0, the feedback unit 270 may control the voltages applied to the position sensor 240 in order to cause the voltage to be 0.

Figure 10:
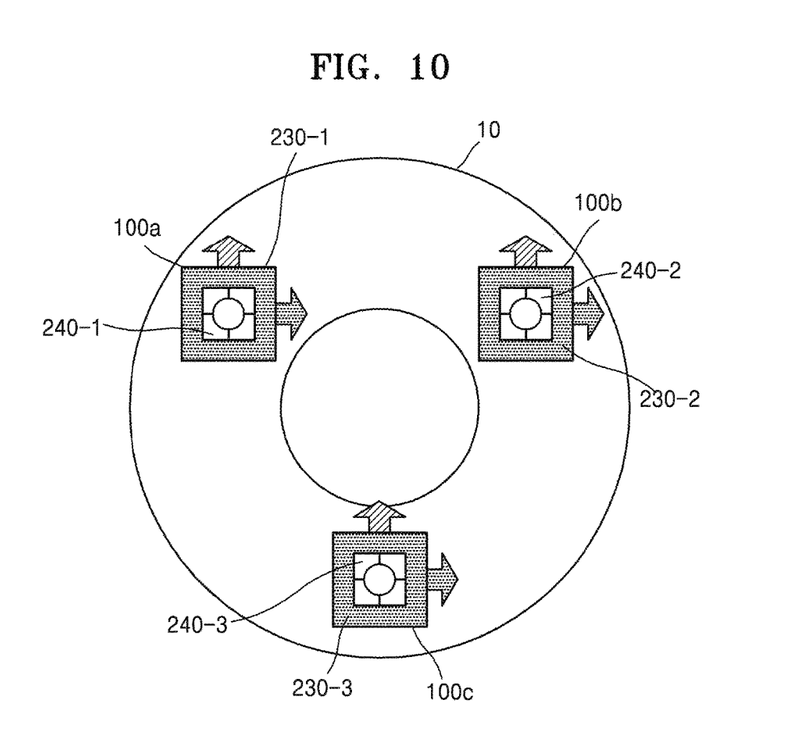
FIG. 10 is a plan view illustrating an arrangement of the plurality of piezoelectric actuators, according to an exemplary embodiment.

FIG. 10 is a plan view illustrating an arrangement of the plurality of piezoelectric actuators 100a, 100b, and 100c, according to an exemplary embodiment.

A plurality of piezoelectric elements 230-1, 230-2, and 230-3 included in the plurality of piezoelectric actuators 100a, 100b, and 1000 may translate the movable member 220 in a 2D plane. Each of the plurality of piezoelectric elements 230-1, 230-2, and 230-3 may correspond to the piezoelectric element 230 of FIG. 2.

The plurality of piezoelectric elements 230-1, 230-2, and 230-3 are radially arranged on one surface of the fixed member 210 of the piezoelectric actuators 100a, 100b, and 100c in order to translate the movable member 220 in the 2D plane. For example, the three piezoelectric elements 230-1, 230-2, and 230-3 are radially arranged with respect to a central point C as shown in FIG. 10. Although the three piezoelectric elements 230-1, 230-2, and 230-3 are radially arranged at intervals of 120° about the central point C in FIG. 10, the present embodiment is not limited thereto. If necessary, four or more piezoelectric elements 230 may be arranged. Distances from the central point C to the piezoelectric elements 230-1, 230-2, and 230-3 do not need to be the same. Also, the three piezoelectric elements 230-1, 230-2, and 230-3 do not need to be arranged to be symmetric with each other. The number and an arrangement of the piezoelectric elements 230 may be appropriately determined according to driving characteristics of the movable member 220. Polarization directions of the three piezoelectric elements 230-1, 230-2, and 230-3 are different from one another in FIG. 10. For example, polarization directions of the three piezoelectric elements 230-1, 230-2, and 230-3 are radial directions having intervals of 120°. A polarization direction refers to a direction in which a piezoelectric element is deformed in a shear mode.

Position sensors 240-1, 240-2, and 240-3 are respectively attached to one surface of the three piezoelectric elements 230-1, 230-2, and 230-3. As the piezoelectric elements 230 is integrated with the position sensors 240, the piezoelectric actuator 200 of FIG. 10 may more precisely measure a motion of the movable member 220. The movable member 220 is attached to surfaces of the position sensors 240 to which the piezoelectric elements 230 are not attached.

As described above, according to the one or more of the above embodiments, a method of measuring a motion may more accurately measure a motion of a movable member by integrating a position sensor with a piezoelectric actuator.

The device described herein may comprise a processor, a memory for storing program data and executing it, a permanent storage such as a disk drive, a communication port for handling communications with external devices, and user interface devices, etc. Any processes may be implemented as software modules or algorithms, and may be stored as program instructions or computer-readable codes executable by a processor on a computer-readable medium. Examples of the computer-readable medium include storage media such as magnetic storage media (e.g., read only memories (ROMs), floppy discs, or hard discs), optically readable media (e.g., compact disk-read only memories (CD-ROMs), or digital versatile disks (DVDs)), etc. The computer-readable recording medium may also be distributed over network coupled computer systems so that the computer-readable code is stored and executed in a distributed fashion. This medium may be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the embodiments, reference has been made to the exemplary embodiments illustrated in the drawings, and specific language has been used to describe these embodiments. The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

The foregoing embodiments may be described in terms of functional block components and various processing steps. Such functional blocks may be realized by any number of hardware and/or software components configured to perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements of the embodiments are implemented using software programming or software elements the embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments could employ any number of conventional techniques for electronics configuration, signal processing and/or control, data processing and the like. The words "mechanism", "element", "unit", and "configuration" are used broadly and are not limited to mechanical or physical embodiments, but can include software routines in conjunction with processors, etc.

The particular implementations shown and described herein are illustrative exemplary embodiments and are not intended to be limited thereto in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

What is claimed is:

1. A piezoelectric actuator comprising:
   a fixed member;
   a movable member that is disposed to face the fixed member;
   a piezoelectric element that is disposed between the fixed member and the movable member, and configured to operate in a shear mode based on input voltages applied to the piezoelectric element and move the movable member relative to the fixed member; and a position sensor that is disposed between the piezoelectric element and the movable member, configured to measure a motion of the movable member, and comprising a plurality of substrates that are sequentially stacked, wherein a first surface of the fixed member and a second surface of the movable member face each other, wherein a surface of the piezoelectric element which faces the second surface of the movable member contacts a surface of the position sensor which faces the first surface of the fixed member, wherein the plurality of substrates comprise a first substrate that comprises a first conductive layer that is coated with a conductor; a second substrate that comprises a second conductive layer having one surface coated with a conductor having a linear pattern; a third substrate that comprises a third conductive layer having one surface coated with a conductor having a circular engraved pattern; and a fourth substrate that comprises a fourth conductive layer having one surface divided into regions each being coated with a conductor, and wherein the first conductive layer, the second conductive layer, and the third conductive layer are disposed to face in a same direction, and the fourth conductive layer is disposed on a surface of the fourth substrate that is spaced apart from the third substrate.

2. The piezoelectric actuator of claim 1, wherein the position sensor comprises a first electrode and a second electrode, wherein the first electrode is fixed to a first region of one surface between the piezoelectric element and the movable member, and the second electrode is fixed to a second region of the one surface.

3. The piezoelectric actuator of claim 1, wherein the position sensor is further configured to measure the motion of the movable member based on a magnitude and a direction of an output voltage that is output from a portion on which the circular engraved pattern is coated.

4. The piezoelectric actuator of claim 1, wherein the position sensor is further configured to, in response to an output voltage corresponding to 0 being output after the input voltages having different magnitudes and opposite phases are applied, measure the motion of the movable member based on a ratio of the different magnitudes.

5. The piezoelectric actuator of claim 1, wherein the input voltages have opposite phases and the position sensor is connected to a voltage applier that is configured to adjust magnitudes of the input voltages.

6. The piezoelectric actuator of claim 1, wherein the second substrate comprises a hole that is filled with a conductive material, and wherein the second substrate is connected to the third conductive layer of the third substrate through the hole.

7. The piezoelectric actuator of claim 1, further comprising a driver that is configured to measure a current that is output from the position sensor.

8. The piezoelectric actuator of claim 1, wherein the piezoelectric element comprises a first piezoelectric layer and a second piezoelectric layer that have different polarization directions.

9. The piezoelectric actuator of claim 1, further comprising an elastic member having one end that contacts the fixed member and another end that elastically presses the movable member toward the piezoelectric element.

10. A method of measuring a motion, the method comprising:

applying to a position sensor input voltages having a predetermined magnitude and opposite phases;

measuring an output voltage that is generated from a motion of a piezoelectric element that is disposed between a fixed member and a movable member, and is fixed to one surface of the position sensor and output from the position sensor based on the applied input voltages; and measuring a motion of the movable member based on the measured output voltage, wherein a first surface of the fixed member and a second surface of the movable member face each other, wherein a surface of the piezoelectric element which faces the second surface of the movable member contacts a surface of the position sensor which faces the first surface of the fixed member, wherein the position sensor comprises a plurality of substrates that are sequentially stacked, wherein the plurality of substrates comprise a first substrate that comprises a first conductive layer that is coated with a conductor; a second substrate that comprises a second conductive layer having one surface coated with a conductor having a linear pattern; a third substrate that comprises a third conductive layer having one surface coated with a conductor having a circular engraved pattern; and a fourth substrate that comprises a fourth conductive layer having one surface divided into regions each being coated with a conductor, and wherein the first conductive layer, the second conductive layer, and the third conductive layer are disposed to face in a same direction, and the fourth conductive layer is disposed on a surface of the fourth substrate that is spaced apart from the third substrate.

11. The method of claim 10, wherein the applying the input voltages comprises applying the input voltages having a same magnitude, and the measuring the motion of the movable member comprises measuring the motion of the movable member based on a magnitude and a direction of the output voltage.

12. The method of claim 10, wherein the applying the input voltages comprises applying the input voltages having different magnitudes, and the measuring the motion of the movable member comprises measuring a position of the movable member based on a ratio of the input voltages in response to the output voltage, that is output after the input voltages having different magnitudes and opposite phases are applied, corresponding to 0.

* * * * *